United States Patent
Benkreira et al.

(10) Patent No.: US 11,227,273 B2
(45) Date of Patent: Jan. 18, 2022

(54) RECOMMENDATION ENGINE BASED ON TIP AMOUNTS

(71) Applicant: Capital One Services, LLC, McLean, VA (US)

(72) Inventors: Abdelkader M'Hamed Benkreira, New York, NY (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/881,573

(22) Filed: May 22, 2020

(65) Prior Publication Data

US 2021/0365916 A1   Nov. 25, 2021

(51) Int. Cl.
*G06Q 20/20* (2012.01)
*G06Q 20/40* (2012.01)

(52) U.S. Cl.
CPC ......... *G06Q 20/204* (2013.01); *G06Q 20/401* (2013.01)

(58) Field of Classification Search
CPC ..... G06Q 20/204; G06Q 20/40; G06Q 20/401
See application file for complete search history.

(56) References Cited

U.S. PATENT DOCUMENTS

| | | | |
|---|---|---|---|
| 9,495,670 B2 | 11/2016 | Bell et al. | |
| 10,636,019 B1* | 4/2020 | Abrons | G06Q 20/3278 |
| 10,949,825 B1* | 3/2021 | Brosamer | G06Q 30/04 |
| 11,030,535 B1* | 6/2021 | Arora | G06Q 30/0282 |
| 2014/0279539 A1 | 9/2014 | Rephlo et al. | |
| 2014/0372284 A1* | 12/2014 | Stekkelpak | G06Q 40/00 705/39 |
| 2016/0042339 A1* | 2/2016 | Nichols | G06Q 20/12 705/35 |
| 2016/0055493 A1* | 2/2016 | Chau | G06Q 20/209 705/7.29 |
| 2016/0350769 A1* | 12/2016 | Venkatesh | G06Q 30/0201 |

(Continued)

OTHER PUBLICATIONS

Karniouchina, Kate, Rohit Verma, and Himanshu Mishra. "Exploring consumer reactions to tipping guidelines: Implications for service quality." (2008). (Year: 2008).*

*Primary Examiner* — Asfand M Sheikh
(74) *Attorney, Agent, or Firm* — Sterne, Kessler, Goldstein & Fox P.L.L.C.

(57) ABSTRACT

A method, system, and non-transitory computer readable medium are disclosed for recommending merchants. The method includes storing a first tip amount and a second tip amount corresponding to a first merchant and a second merchant, respectively. Then, categorizing the first tip amount and the second tip amount into a lower weighted category or higher weighted category. The method also includes generating, using a weighted model that includes machine learning logic: a first score for the first merchant based on the first tip amount and the category of the first tip amount; and a second score for the second merchant based on the second tip amount and the category of the second tip amount. Tip amounts in the higher weighted category carry more weight in generating scores than those in the lower weighted category. Then, either the first merchant or the second merchant is recommended based on the scores.

20 Claims, 5 Drawing Sheets

(56) References Cited

U.S. PATENT DOCUMENTS

| | | | |
|---|---|---|---|
| 2017/0032385 A1* | 2/2017 | Thomas | G06Q 50/12 |
| 2017/0345068 A1* | 11/2017 | Rosch | G06Q 30/0283 |
| 2018/0174154 A1* | 6/2018 | Bhattacharjee | G06Q 30/016 |
| 2018/0181941 A1* | 6/2018 | Maxwell | G06Q 20/209 |
| 2018/0261223 A1* | 9/2018 | Jain | G06F 40/35 |
| 2019/0139014 A1 | 5/2019 | Carlson et al. | |
| 2020/0258075 A1* | 8/2020 | Rustique | G06Q 20/3224 |

* cited by examiner

RECOMMENDATION ENGINE BASED ON TIP AMOUNTS

BACKGROUND

When potential customers seek recommendations for restaurants, they often desire that the recommendations they receive accurately reflect the true value of the restaurant in terms of customer experience from other customers. The same may be applicable to other merchant types such as house-cleaners, mechanics, plumbers, health-care providers, travel companies, etc. However, current metrics for making such recommendations have several confounding variables. As a result, recommendations made on the basis of such metrics are often inaccurate.

BRIEF SUMMARY

In general, one or more embodiments are directed towards a method. The method comprises: storing, by one or more computing devices, in a data repository, a first merchant transaction from a point of sale or customer credit card information that includes a first tip amount and corresponds to a first merchant, and a second merchant transaction that includes a second tip amount and corresponds to a second merchant. The method further comprises: categorizing, by the one or more computing devices, each of the first tip amount and the second tip amount into a lower weighted category or higher weighted category. Further still, the method comprises: generating, by the one or more computing devices and using a weighted model that includes machine learning logic: a first score for the first merchant based on the first tip amount and the category of the first tip amount; and a second score for the second merchant based on the second tip amount and the category of the second tip amount, wherein tip amounts in the higher weighted category carry more weight in generating the score than those in the lower weighted category. The method also comprise: recommending, by the one or more computing devices, either the first merchant or the second merchant based on the first score and the second score.

In general, one or more embodiments are directed towards a system comprising a memory and a microprocessor coupled to the memory, and a data repository within said memory. The microprocessor is configured to perform operations comprising: storing within the data repository, a first merchant transaction from a point of sale or customer credit card information that includes a first tip amount and corresponds to a first merchant, and a second merchant transaction that includes a second tip amount and corresponds to a second merchant; and categorizing each of the first tip amount and the second tip amount into a lower weighted category or higher weighted category. The microprocessor is further configured to perform operations comprising: generating, using a weighted model that includes machine learning logic: a first score for the merchant based on the first tip amount and the category of the first tip amount; and a second score for the second merchant based on the second tip amount and the category of the second tip amount, wherein tip amounts in the higher weighted category carry more weight in generating the score than those in the lower weighted category. The operations also comprise: recommending either the first merchant or the second merchant based on the first score and the second score.

In general, one or more embodiments are directed towards a non-transitory computer-readable storage device having instructions stored thereon that, when executed by at least one computing device, causes the at least one computing device to perform operations. The operations comprise: storing, in a data repository, a first merchant transaction from a point of sale or customer credit card information that includes a first tip amount and corresponds to a first merchant, and a second merchant transaction that includes a second tip amount and corresponds to a second merchant; and categorizing, each of the first tip amount and the second tip amount into a lower weighted category or higher weighted category. The operations further comprise: generating, using a weighted model that includes machine learning logic: a first score for the first merchant based on the first tip amount and the category of the first tip amount; and a second score for the second merchant based on the second tip amount and the category of the second tip amount, wherein tip amounts in the higher weighted category carry more weight in generating the score than those in the lower weighted category. The operations also comprise: recommending either the first merchant or the second merchant based on the first score and the second score.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, apparatus, device, method and/or computer program product embodiments, and/or combinations and sub-combinations thereof, for accurately recommending merchants (e.g., restaurants) based on tip amounts given by customers to the merchants and the tipping consistency of the customers. Specifically, a customer may be categorized based on his/her tipping consistency (e.g., consistent tipper type, variable tipper type, etc.) using machine learning. Then, a tip amount given by the customer to the merchant may be categorized as belonging to a higher weighted category or a lower weighted category in view of the tipping consistency of the customer. Additional categories are possible. A model may be used to generate a score for the merchant based on the categorized tip amounts, with tip amounts in the higher weighted category having greater impact on the score for the merchant than tip amounts in the lower weighted category. The larger the score, the more likely the merchant is to be recommended to a user.

Tip amounts, in the aggregate, may be used for designating the true rating of a merchant's quality of service. However, aggregated tip amounts do not take into account the different behaviors of customers in tipping.

For example, some customers may tip the same amount regardless of the merchant, and thus the tip amount might not indicate any value at all for a particular merchant since the amount is always the same. Therefore assigning value to the merchant based on a tipping amount in such a situation may skew the true value of the merchant. In a similar manner, other customers may always tip a proportion of their bill (such as 5$ out of a 100$ bill, 10$ out of a 200$ bill, always equaling 5%, etc.) Another customer, in a similar fashion, may only tip in a tight percentage range such as (15-20%), which again makes it hard to tie the tipping amount to actual differences that the customer felt in terms of the experience.

Also often skewing the true value of the restaurant are tips in 0$ amounts. Such tips often occur, for example, because the user paid the tip in cash instead of using a credit card, and therefore no tip transaction shows up on the credit card statement, or another member in a party paid for the tip. As a result, these tipping amounts also do not reflect the true value of the customer experience, and as such should not be factored in, in terms of tipping amount, so as not to skew the true value reflective of experience.

On the other hand, when customers tip generously in some cases but do not tip generously in other cases, then a value-based standard may be established. In these cases, because of an actual difference in experience that the customer felt reflected the value of the merchant, they tipped more or less than they usually do. In this case, the customer tip can serve as a more effective proxy for the user experience, and as such assigning value to the tipping amount from such customers serves to more effectively account for customer experience.

At the same time, this standard may also be simultaneously applied to the above categories of users that normally should not have value assigned to their tipping amount. For example, for a customer who regularly tips $0 amounts, who then tips 20% of a new bill, or for a user who usually tips within a narrow range of 15-20%, tips 25% for a bill, etc., a value-based standard is established relative to the customer's norm (20% vs. 0$, 25% vs. 15%, etc.). With such a standard, there is a clear basis for comparison against which value may be measured.

Figure 1:
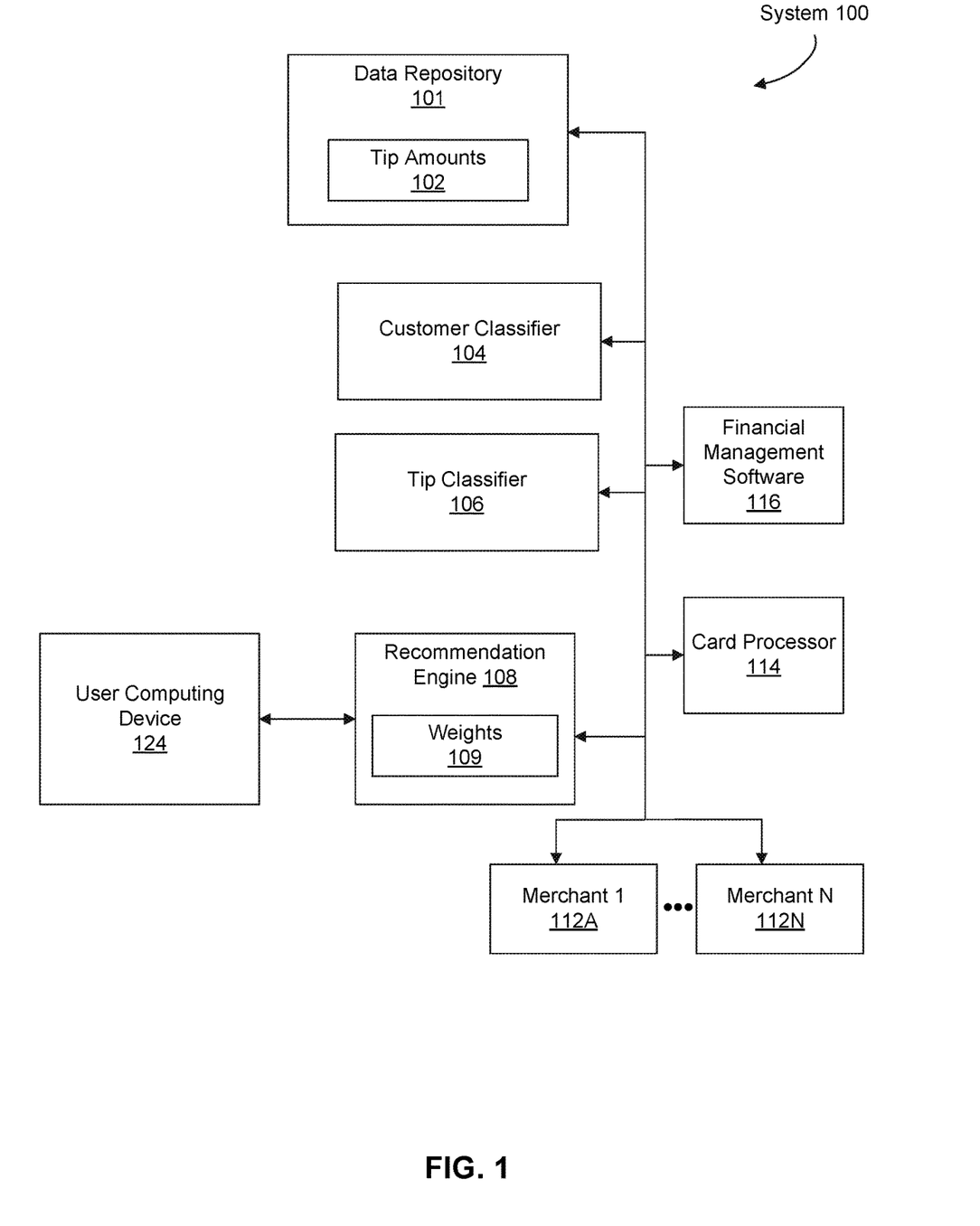
FIG. 1 is a block diagram of system for recommending merchants based on tips in accordance with one or more embodiments.

FIG. 1 shows a system 100 for recommending merchants based on tip amounts in accordance with one or more embodiments. As shown in FIG. 1, the system 100 has multiple components including a data repository 101, a customer classifier 104, a tip classifier 106, and a recommendation engine 108. Each of these components (101, 104, 106, 108) may be implemented using hardware, software, or any combination of hardware or software. Moreover, these components (101, 104, 106, 108) may be implemented on the same computing device (e.g., cloud-based server, mainframe, desktop personal computer (PC), smart phone, tablet PC, etc.) or on two or more computing devices connected by a network of any size having wired and/or wireless segments.

In one or more embodiments, the data repository 101 stores merchant transactions including tip amounts 102 given by customers to merchants (e.g., merchant 1 112A, . . . , merchant N 112N). These tip amounts 102 may be obtained from one or more sources including, for example, financial data provided by the merchants 112 themselves, credit card transaction information provided by one or more card processors (e.g., card processor 114) that handle credit/debit card transactions between the customers and the merchants 112, data from financial management software 116 (e.g., personal accounting software, budgeting software, expense tracking software, tax preparation software, etc.) operated by the customers (or merchants 112) to manage their finances, etc. The data repository 101 may be a database and store the tip amounts 102 within transaction records. Moreover, the data repository 101 may include functionality to extract the tip amounts 102 from financial information provided by a source (112, 114, 116).

In one or more embodiments, the customer classifier 104 is configured to categorize customers into types based on tipping consistency. A customer is categorized as a consistent tipper type if some threshold proportion of the customer's tip amounts are within a currency amount range or a percentage amount range. In one or more embodiments, if the customer is not categorized as a consistent tipper type, the customer is categorized as a variable tipper type. The customer classifier 104 may be implemented using one or more machine learning algorithms (e.g., clustering algorithms, linear regression, support-vector machines, etc.). Additional details regarding categorizing customers is discussed below, in reference to FIG. 2 and FIG. 3.

In one or more embodiments, the customer classifier 104 is also configured to categorized customers into types based on tipping consistency per merchant type (e.g., restaurants, bars, taxi services, pet boarding, barber shops/hair salons, etc.). In other words, a single customer may be categorized differently for different merchant types. For example, a customer may be categorized as a consistent tipper type for restaurants and bars, but the same customer may be categorized as a variable tipper type for barbers and taxi services.

In one or more embodiments, the tip classifier 106 is configured to categorize each of the tip amounts 102 as belonging to a higher weighted category or a lower weighted category. This tip amount categorization is based on whether the customer is a consistent tipper type or a variable tipper type. If the customer is categorized as a consistent tipper type and the tip amount deviates from or is outside (e.g., above or below) the currency amount range or the percentage amount range for the customer, the tip amount is categorized as belonging to a higher weighted category. In contrast, if the customer is categorized as a consistent tipper type and the tip amount is within the currency amount range or percentage amount range, the tip amount is categorized as belonging to a lower weighted category. Additional details regarding categorizing tips is discussed below, in reference to FIG. 2 and FIG. 3. Further, although the disclosed embodiments focus on two categories (e.g., higher weighted category, lower weighted category), in other embodiments, there may be three or more categories. For example, if the tip amount is outside the currency amount range or the percentage amount range for the customer, but not more than twice (or some other factor) the upper end of the range, the tip amount can be categorized as belonging to category X. If the tip amount is more than twice the upper end of the range but less than 3.5× the upper end of the range, the tip amount can be categorized as belonging to category Y. If the tip amount is more than 3.5× the upper end of the range, the tip amount can categorized as belonging to category Z, etc.

In one or more embodiments, the recommendation engine 108 is configured to generate scores for the merchants and then recommend one or more merchants based on the scores. The scores may reflect the quality of the service provided by the merchants. The scores may be generated based on the categorized tip amounts and the recommended merchants may correspond to the merchants with the top N scores (e.g., N=3). The score may be generated by a weighted model with machine learning logic that inputs the categorized tip amounts and applies weights 109 to various values (e.g., tip amounts themselves, ratios based on the tip amounts, etc.) to calculate the scores for the merchants (discussed below). The machine learning logic may first need to be trained using historic data (e.g., historic tip amounts, historic categorizations, historic ratios, historic weights, historic scores, etc.) The recommended merchants may be transmitted to a user computing device 124 (e.g., desktop PC, laptop, smart phone, tablet PC, etc.) based on the notification settings of the user and displayed within a GUI. Although FIG. 1 only shows a single user computing device 124, there may be any number of user computing devices operated by any number of users.

Figure 2:
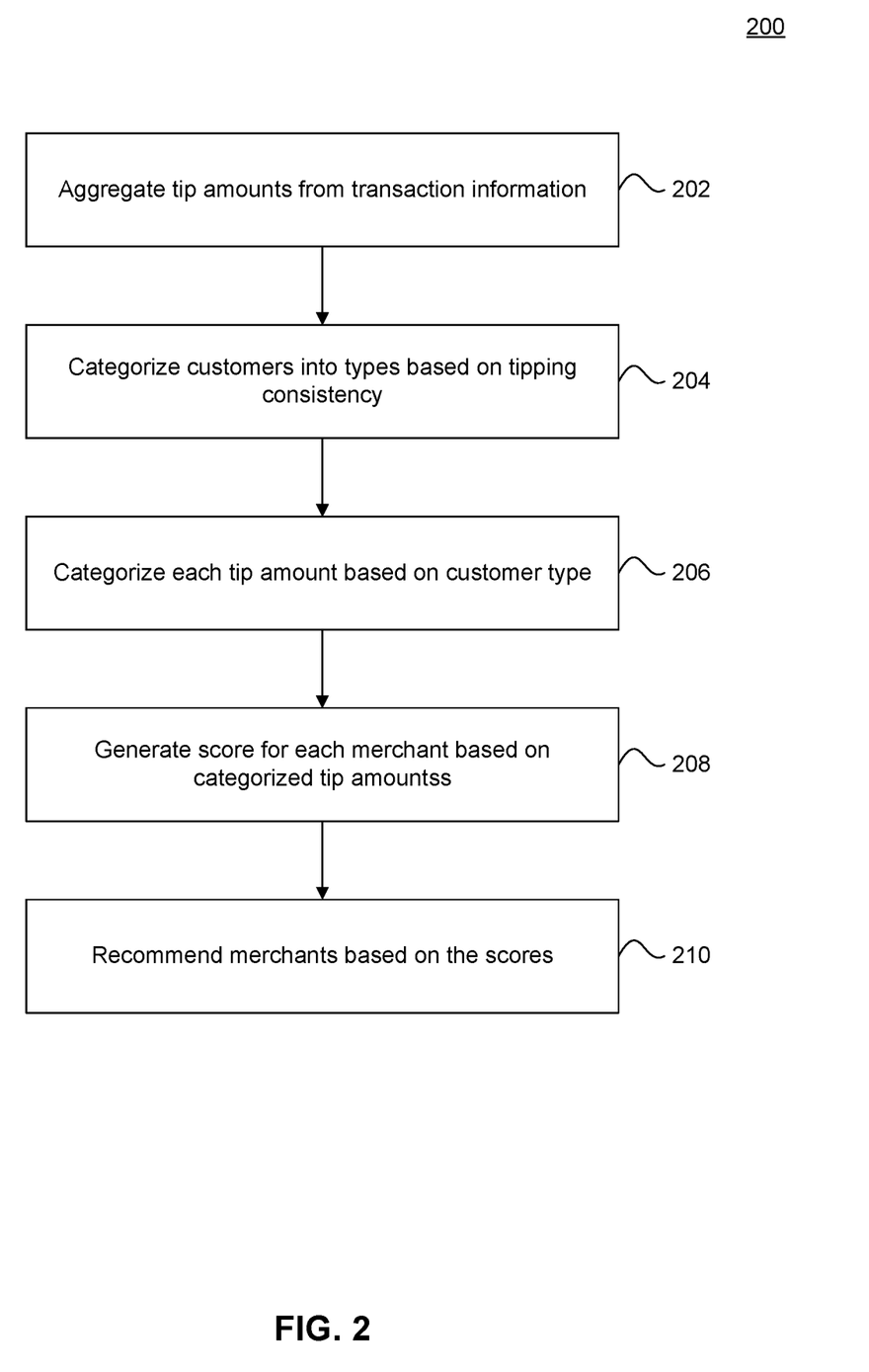
FIG. 2 is a flowchart illustrating the generation of scores for merchants based on tips and the categorization of customers by tipping consistency according to one or more embodiments.

FIG. 2 shows a flowchart in accordance with one or more embodiments. The flowchart of FIG. 2 illustrates a process for generating scores for merchants based on tips and the categorization of customers by tipping consistency. One or more steps in FIG. 2 may be performed by one or more of the components shown in FIG. 1. One or more of the steps shown in FIG. 2 may be omitted, repeated, and/or performed in a different order than the order shown in FIG. 2. Accordingly, the scope of the invention should not be considered limited to the specific arrangement of steps shown in FIG. 2. The steps shown in FIG. 2 may be implemented as computer-readable instructions stored on computer-readable media, where, when the instructions are executed, cause a processor to perform the process of FIG. 2

In step 202, tip amounts given by customers to merchants are obtained. One or more of the tip amounts may be obtained from transaction data managed by financial institutions, card processors, merchants, and/or financial software operated by the customer (e.g., personal accounting software, budgeting software, expense tracking software, tax preparation software, etc.). For example, transaction data may explicitly disclose a tip amount given by a customer to a merchant and obtaining the tip amount may include parsing the transaction data. As another example, transaction data involving a credit card may disclose an initial authorized amount and a settled amount. The difference between the settled amount and the initial authorized amount corresponds to the tip amount given by a customer to the merchant. All the obtained transaction data may be aggregated and stored in a data repository before determining the tip amounts.

In step 204, customers are categorized into types based on tipping consistency. In one or more embodiments, a customer is categorized as a consistent tipper type if some threshold proportion of the customer's tip amounts are within a currency amount range or a percentage amount range. For example, if at least 80% of the customer's tip amounts are between $4.90 and $5.10, the customer is categorized as a consistent tipper. As another example, if at least 88% of the customer's tip amounts are between 16% and 19% of the bill amount, the customer is categorized as a consistent tipper type. In one or more embodiments, if the customer is not categorized as a consistent tipper type, the customer is categorized as a variable tipper type. Machine learning (e.g., clustering algorithms, linear regression, support-vector machines, etc.) may be applied to the tip amounts to determine ranges and/or determine whether the customer should be categorized as a consistent tipper type or a variable tipper type. If a customer has some $0 tip amounts, these $0 tip amounts may be indicative that the customer gave a tip in cash or by some other non-memorized means. Accordingly, some or all of the $0 tips amounts given by a customer may be excluded from further consideration.

In step 206, each tip amount given by a customer is categorized as belonging to a higher weighted category or a lower weighted category. This tip amount categorization is based on whether the customer is a consistent tipper type or a variable tipper type. If the customer is categorized as a consistent tipper type and the tip amount is outside (e.g., above or below) the currency amount range or the percentage amount range for the customer, the tip amount is categorized as belonging to a higher weighted category. For example, if the percentage amount range for the customer is 15% to 20%, and the tip amount given by the customer is 30% (i.e., above the range), the tip amount is categorized as belonging to the higher weighted category. As another example, if the currency amount range for the customer is $7.45 to $10.03, and the tip amount given by the customer is $3.10 (i.e., below the range), the tip amount is categorized as belonging to the higher weighted category.

In contrast, if the customer is categorized as a consistent tipper type and the tip amount is within the currency amount range or percentage amount range, the tip amount is categorized as belonging to a lower weighted category. For example, if the percentage amount range for the customer is 15% to 20%, and the tip amount given by the customer is 17.5% (i.e., within the range), the tip amount is categorized as belonging to the lower weighted category. In another example, if the currency amount range is $7 to $10 for the customer, and the tip amount given by the customer is $8.30 (i.e., within the range), the tip amount is categorized as belonging to the lower weighted category.

Those skilled in the art, having the benefit of this detailed description, will appreciate that when a tip amount associated with a consistent tipper type is categorized as belonging to the higher weighted category, the tip amount given by the customer is indicative of exceptional service (i.e., tip amount is above the range) or substandard service (i.e., tip amount is below the range) provided by the merchant because the tip is outside the usual range for the customer. Accordingly, this tip amount should have more impact on the score for the merchant. In contrast, when a tip amount associated with a consistent tipper type is categorized as belonging to the lower weighted category, the tip amount given by the customer is indicative of standard service from the merchant and/or the personal policy of the customer to give a tip regardless of the service received by the merchant. Accordingly, this tip amount should have less impact on the score for the merchant.

In one or more embodiments, if the customer is categorized as a variable tipper type, the tip amount given by the customer is automatically categorized as belonging to the higher weighted category. As this type of customer does not have a usual range, the tipping amount is directly tied to the service provided by the merchant. Accordingly, this tip amount should have more impact on the score for the merchant.

Further, although the disclosed embodiments focus on two categories (e.g., higher weighted category, lower weighted category), in other embodiments, there may be three or more categories. For example, if the tip amount is outside the currency amount range or the percentage amount range for the customer, but not more than twice (or some other factor) the upper end of the range, the tip amount is categorized as belonging to category X. If the tip amount is more than twice the upper end of the range but less than 3.5× the upper end of the range, the tip amount is categorized as belonging to category Y. If the tip amount is more than 3.5× the upper end of the range, the tip amount is categorized as belonging to category Z, etc. Moreover, in other embodiments, tip amounts from variable tipper type customers may be assigned to different categories than tip amounts from consistent tipper type customers.

In step 208, a score is generated for each merchant based on the categorized tip amounts for the merchant. The score represents the quality of service delivered by the merchant. The score may be generated by a weighted model with machine learning logic that inputs the categorized tip amounts. For example, in order to generate the score for the merchant, the model may average all the tip amounts for the merchant in the higher weighted category ("average A"), average all the tip amounts for the merchant in the lower weighted category ("average B"), and then calculate a weighted average of average A and average B, with average A given more weight than average B. In general, tip amounts belonging to different categories (e.g., category X, category Y, category Z, etc.) may be assigned different weights. The further away from the upper or lower ends of the percentage amount range or currency amount range, the heavier the weight.

Additionally or alternatively, in order to generate the score for the merchant, the model may calculate a ratio for each tip amount given to the merchant. The ratio may be of the tip amount given by the customer (to the merchant) to the average of the currency amount range or percentage amount range for the customer. For example, if the tip amount given by the customer to the merchant is $25, and the currency amount range for the customer is $2.50-$5.00, the ratio for the $25 tip amount for the merchant may be calculated as $25/[($5.00+$2.5)/2]. As another example, if the tip amount given by the customer to the merchant is 5%, and the percentage amount range for the customer is 15%-20%, the ratio for the 5% tip amount given to the merchant may be calculated as 5%/[(15%+20%)/2]. Instead of using the average of the currency amount range or percentage amount range as the divisor, the minimum value or the maximum value of the range may be used as the divisor. In the case of the maximum amount, the ratio for the $25 tip amount given to the merchant may be calculated as $25/$5.00, and the ratio for the 5% tip amount given to the merchant may be calculated as 5%/20%.

This ratio calculation may be performed for every tip amount given to the merchant. The score for the merchant may be calculated by averaging the ratios, with ratios corresponding to tip amounts assigned to the higher weighted category being given more weight than the ratios corresponding to tip amounts assigned to the lower weighted category. One or more of the weights 109 used in the calculations may be provided by the user.

Additionally or alternatively, the machine learning logic may also input "how" the tip to the merchant was specified (by the customer) in order to generate a score for the merchant. For example, when it is time to pay, the merchant may present standard tipping amounts (e.g., 15%, 18%, 20%, etc.) to customers on an electronic payment terminal, tablet PC, touchscreen, etc. The customers may choose one of the standard tipping amounts. However, customers are often able to enter a custom tip amount (i.e., not one of the standard tipping amounts) if desired. It is statistically likely that a customer will select one of the standard tipping amounts. Accordingly, a custom tip amount may be given more weight than a standard/recommended tip amount in the score generation since the customer is acting out of the ordinary and taking a much more active role in deciding a tip amount. In other words, a custom tip amount may be a better indication of the merchant's quality of service. By including, as an input, "how" the tip was specified (e.g., custom vs. standard), the machine learning logic can more easily identify custom tip amounts and assign higher weights to the custom tip amounts for the score generation.

In one or more embodiments, the score for a merchant, as determined from tipping amounts, may be combined with a score for the merchant that is based on reviews (or additional criteria) to arrive at an overall score for the merchant. In one or more embodiments, the score for a merchant may be normalized between 0-5 (e.g., 0-5 stars).

In step 210, merchants are recommended to a user based on the scores. For example, the merchants with the top three scores are presented to the user. The number of recommended merchants presented to a user may be controlled by the user's settings.

Figure 3:
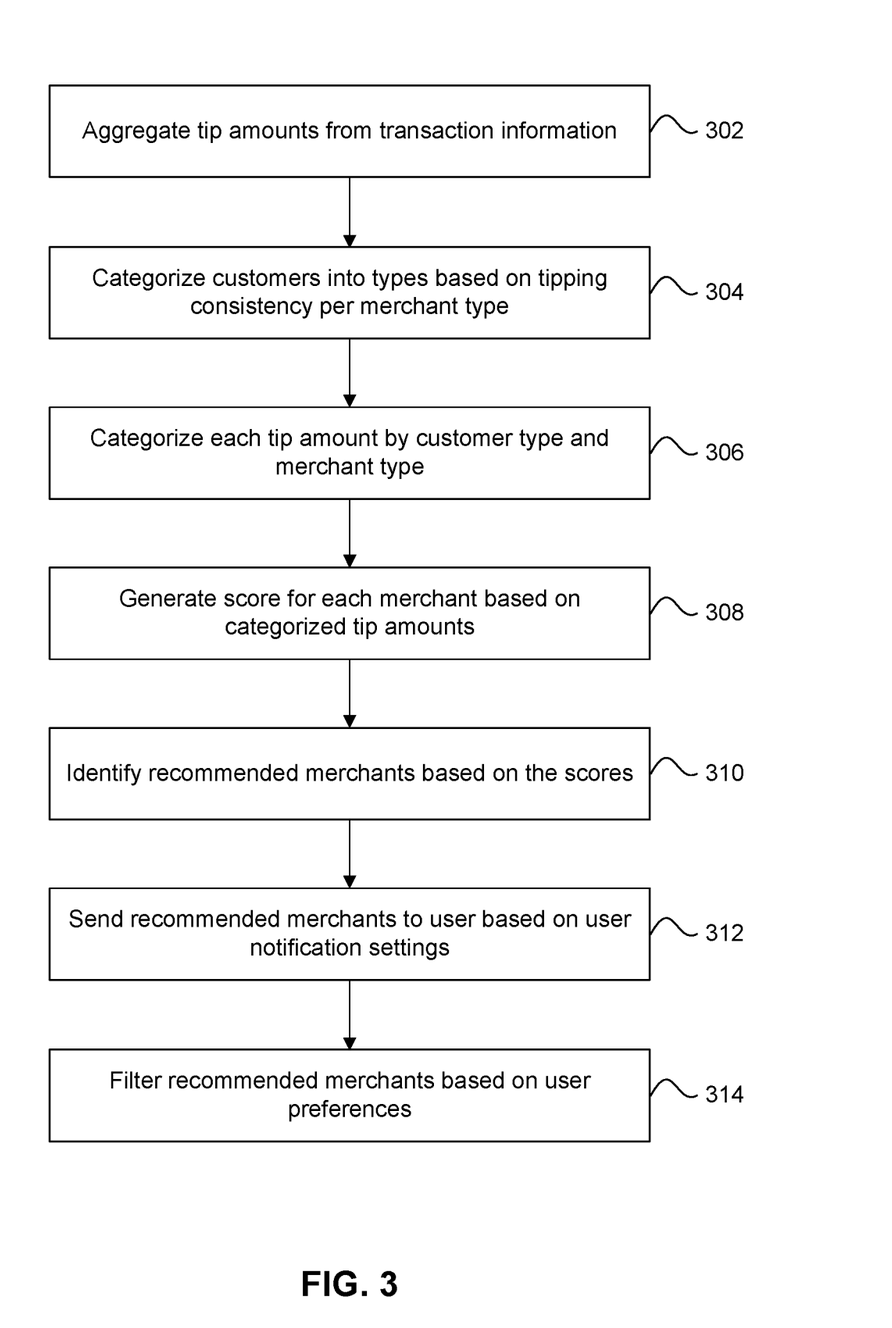
FIG. 3 is a flowchart illustrating the generation of scores for merchants based on tips and the categorization of customers by tipping consistency per merchant type in accordance with one or more embodiments.

FIG. 3 shows a flowchart in accordance with one or more embodiments. The flowchart of FIG. 3 illustrates a process for generating scores for merchants based on tips and the categorization of customers by tipping consistency per merchant type. One or more of the steps in FIG. 3 may be performed by the components of FIG. 1. One or more of the steps shown in FIG. 3 may be omitted, repeated, and/or performed in a different order than the order shown in FIG. 3. Accordingly, the scope of the invention should not be considered limited to the specific arrangement of steps shown in FIG. 3. The steps shown in FIG. 3 may be implemented as computer-readable instructions stored on computer-readable media, where, when the instructions are executed, cause a processor to perform the process of FIG. 3.

In step 302, tip amounts given by customers to merchants are obtained. One or more of the tip amounts may be obtained from transaction data managed by financial institutions, card processors, merchants, and/or financial software operated by the customer (e.g., personal accounting software, budgeting software, expense tracking software, tax preparation software, etc.). For example, transaction data may explicitly disclose a tip amount given by a customer to a merchant and obtaining the tip amount may include parsing the transaction data. As another example, transaction data involving a credit card may disclose an initial authorized amount and a settled amount. The difference between the settled amount and the initial authorized amount corresponds to the tip amount given by a customer to the merchant. All the obtained transaction data may be aggregated and stored in a data repository before determining the tip amounts. Step 302 may be essentially the same as step 202, discussed above in reference to FIG. 2.

In step 304, customers are categorized into types based on tipping consistency per merchant type (e.g., restaurants, bars, taxi services, pet boarding, barber shops/hair salons, etc.). In one or more embodiments, a customer is categorized as a consistent tipper type for a merchant type if some threshold proportion of the customer's tip amounts given to merchants of the merchant type are within a currency amount range or a percentage amount range. For example, if at least 90% of the customer's tip amounts to restaurants are between 17% and 20% of the base price, the customer is categorized as a consistent tipper type for restaurants. In one or more embodiments, if the customer is not categorized as a consistent tipper type for a merchant type, the customer is categorized as a variable tipper type for the merchant type. A single customer may be categorized differently for different merchant types. For example, the same customer may be categorized as a consistent tipper type for restaurants and bars, but categorized as a variable tipper type for barbers and taxi services.

Step 304 is similar to step 204, discussed above in reference to FIG. 2. Accordingly, as discussed above, machine learning (e.g., clustering algorithms, linear regression, support-vector machines, etc.) may be applied to the tip amounts to determine ranges and/or determine whether the customer should be categorized as a consistent tipper type or a variable tipper type for each merchant type.

In Step 306, each tip amount given by a customer to a merchant is categorized as belonging to a higher weighted category or a lower weighted category. This tip amount categorization is based on whether the customer is a consistent tipper type or a variable tipper type for the merchant type of the merchant. If the customer is categorized as a consistent tipper type for the merchant type, and the tip amount deviates from or is outside (e.g., above or below) the currency amount range or the percentage amount range for the customer, the tip amount is categorized as belonging to a higher weighted category. For example, if the percentage amount range for the customer is 15% to 20% for restaurants, and the tip amount given by the customer to a restaurant is 30% (i.e., above the range), the tip amount is categorized as belonging to the higher weighted category.

In contrast, if the customer is categorized as a consistent tipper type for the merchant type and the tip amount is within the currency amount range or percentage amount range, the tip amount is categorized as belonging to a lower weighted category. For example, if the percentage amount range for the customer is 5% to 10% for taxi services, and the tip amount given by the customer to a taxi service is 7.5% (i.e., within the range), the tip amount is categorized as belonging to the lower weighted category.

Those skilled in the art, having the benefit of this detailed description, will appreciate that when a tip amount associated with a consistent tipper type is categorized as belonging to the higher weighted category, the tip amount given by the customer is indicative of exceptional service (i.e., tip amount is above range) or substandard service (i.e., tip amount is below range) provided by the merchant because the tip is outside the usual range for the customer. Accordingly, this tip amount should have more impact on the score for the merchant. In contrast, when a tip amount associated with a consistent tipper type is categorized as belonging to the lower weighted category, the tip amount given by the customer is indicative of standard service from the merchant and/or the personal policy of the customer to give a tip regardless of the service received by the merchant. Accordingly, this tip amount should have less impact on the score for the merchant.

In one or more embodiments, if the customer is categorized as a variable tipper type for the merchant type, the tip amount given by the customer to the merchant belonging to the merchant type is automatically categorized as belonging to the higher weighted category. As this type of customer does not have a usual range, the tipping amount is directly tied to the service provided by the merchant. Accordingly, this tip amount should have more impact on the score for the merchant.

In step 308, a score is generated for each merchant based on the categorized tip amounts for the merchant. The score may be generated by a weighted model with machine learning logic that inputs the categorized tip amounts. Step 308 is similar to step 208, discussed above in reference to FIG. 2.

In step 310, recommended merchants are identified based on the scores. Within a given merchant type, the merchants with the top N (e.g., N=3) scores may be identified as recommended merchants. Alternatively, a different number of recommended merchants may be identified for different merchant types. For example, the top two taxi services, as established by the scores, may be identified as recommended merchants, while the top 10 restaurants, as established by the scores, may be identified as recommended merchants.

In step 312, the recommended merchants are sent to the user based on the user notification settings. For example, the recommended merchants may be sent to user's mobile device if the merchant explicitly requests (e.g., via a GUI button) recommended merchants. Additionally or alternatively, the user may specify that recommended merchants be pushed to the user's mobile device as soon as the recommended merchants are identified and/or as soon as the user enters a new geographic region (e.g., zip code, neighborhood, city, etc.), as determined from the GPS coordinates of the user's mobile device. Moreover, the user may specify in the notification settings that only recommended merchants belonging to one or more merchant types be sent over (e.g., recommended restaurants and recommended bars, but not recommended hair salons). The user may adjust the notification settings at any time.

In step 314, the recommended merchants received by the user may be filtered based on the user's preferences. These user preferences may include the maximum distance between the user and the merchants (e.g., only merchants within a 1-mile radius), the current wait time at the merchant (e.g., only merchants with a current wait time of 15 minutes or less), and/or subcategories within the merchant type (e.g., Italian restaurants, Chinese restaurants, etc.).

Figure 4:
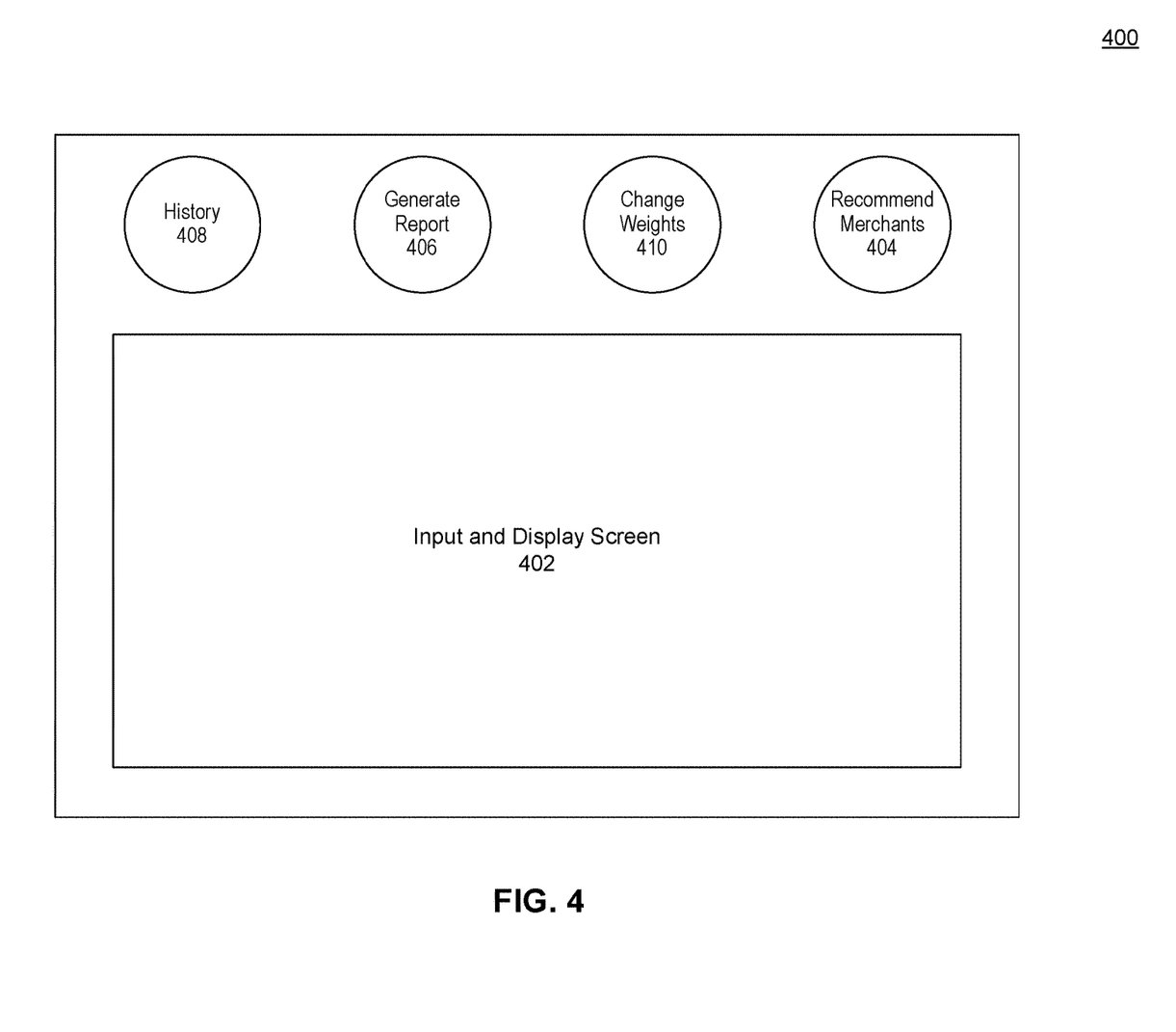
FIG. 4 is an example graphical user interface (GUI) for showing recommended merchants in accordance with one or more embodiments.
Figure 5:
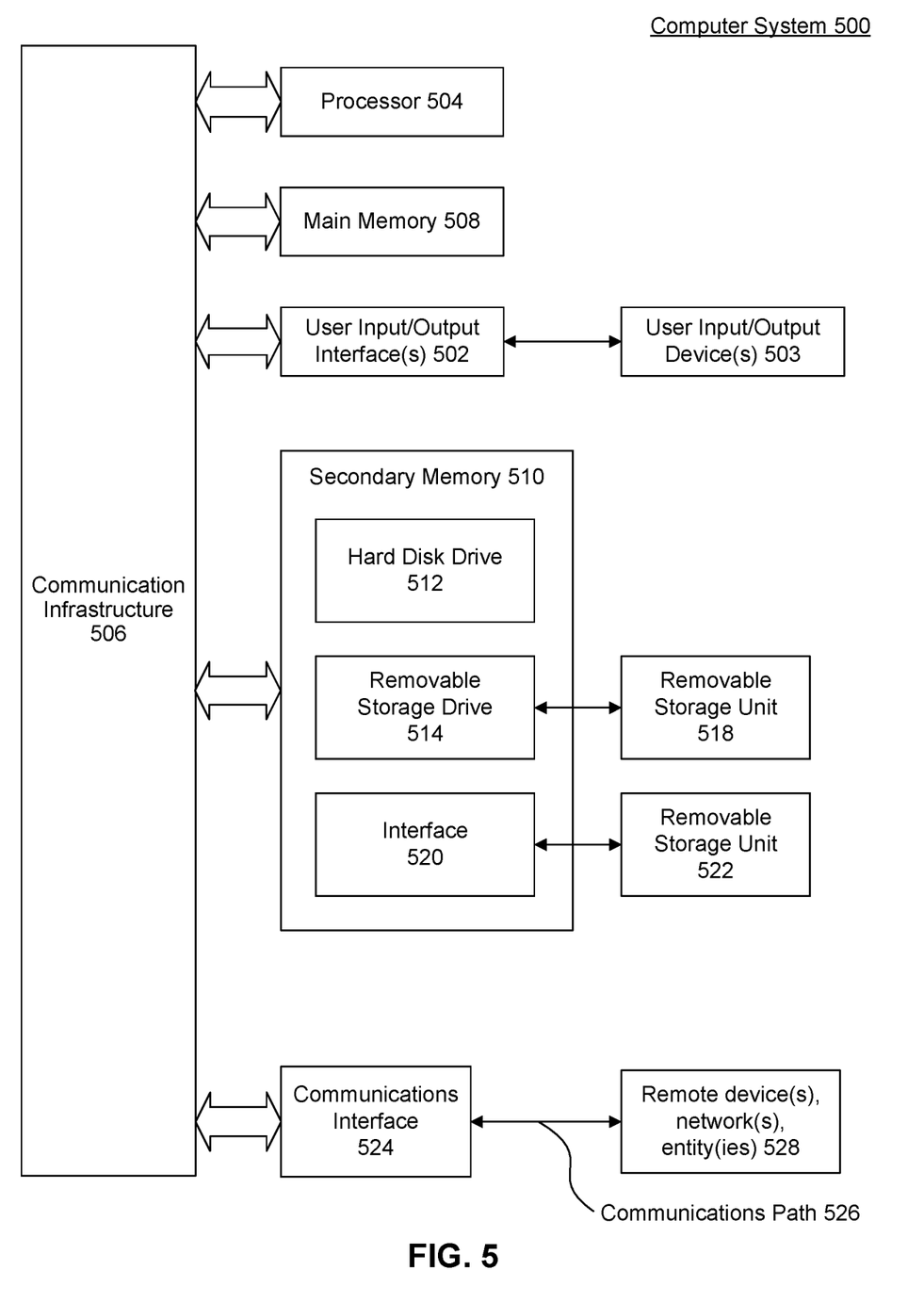
FIG. 5 is a block diagram of example components of the underlying structure of any of the systems presented in the following embodiments.

FIG. 4 is an example graphical user interface (GUI) 400 for showing recommended merchants and other data in accordance with one or more embodiments. The GUI 400 may be executed on a user computing device (e.g., user computing device 124, discussed above in reference to FIG. 1). As shown in FIG. 4, the GUI 400 includes multiple buttons (e.g., history button 408, recommended merchants button 406, change weights button 410) and a screen for input and display 402.

In one or more embodiments, the recommend merchants button 406 is selected by the user to request recommended merchants. Invoking the recommend merchants button 406 may trigger one or more of the steps shown in FIG. 2 or FIG. 3 to be executed, and the resulting recommended merchants to be transmitted to the user's mobile device and displayed on the screen 402. The screen 402 may have additional controls (not shown) for applying filters (e.g., current wait times, distances, subcategories, etc.) to the recommended merchants.

In one or more embodiments, the change weights button 410 is selected by the user to modify how merchant scores are generated. Specifically, selecting the change weights button 410 may cause the screen 402 to display GUI widgets (not shown) for inputting weights or parameters. The input weights may be transmitted by the user's computing device to the recommendation engine 108 for use in generating the scores (e.g., for use in calculating the weighted averages, discussed above in reference to FIG. 2 and FIG. 3). Additionally or alternatively, the input parameters may be transmitted by the user's computing device to the customer classifier 104 for use in categorizing customers based on tipping consistency (e.g., the input parameters may be used for adjusting the machine learning algorithms).

In one or more embodiments, the history button 408 is selected by the user to view previous merchants that have been recommended to the user. These previously recommended users may be displayed on the screen 402 and are searchable by the user.

Various embodiments can be implemented, for example, using one or more computer systems, such as computer system 600 shown in FIG. 6. Computer system 600 can be used, for example, to implement the processes shown in FIG. 2 and FIG. 3. Computer system 600 can also be used to implement the GUI shown in FIG. 4 and/or one or more of the components shown in FIG. 1. Computer system 600 can be any computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
    storing, by one or more computing devices, in a data repository, a plurality of transactions comprising:
        a first transaction from a point of sale or customer credit card information that includes a first tip amount given by a first customer to a first merchant, and
        a second transaction that includes a second tip amount given by the first customer to a second merchant;
    categorizing, by a machine learning algorithm configured to cluster, the first customer as a consistent tipper based on the plurality of transactions;
    determining a tip range for the first customer;
    in response to categorizing the first customer as a consistent tipper and the first tip amount falling outside the tip range for the first customer, categorizing, by the one or more computing devices, the first tip amount into a first higher weighted category associated with the first merchant, wherein the first merchant is further associated with a first lower weighted category;
    in response to categorizing the first customer as a consistent tipper and the second tip amount falling within the tip range for the first customer, categorizing, by the one or more computing devices, the second tip amount into a second lower weighted category associated with the second merchant, wherein the second merchant is further associated with a second higher weighted category;
    generating, by the one or more computing devices:
        a first score for the first merchant based on the first tip amount and a weight assigned to the first higher weighted category associated with the first merchant comprising the first tip amount; and
        a second score for the second merchant based on the second tip amount and a weight assigned to the second lower weighted category associated with the second merchant comprising the second tip amount; and
    causing, by the one or more computing devices, a graphical user interface (GUI) to be displayed on a computing device of a user, the GUI comprising:
        a recommendation of either the first merchant or the second merchant for the user based on the first score and the second score; and
        one or more GUI widgets for adjusting the weight assigned to the first higher weighted category and the weight assigned to the second lower weighted category.

2. The method of claim 1, wherein the first tip amount is a zero amount tip.

3. The method of claim 1, further comprising:
    categorizing a third tip amount given by a second customer to the second merchant into the second higher weighted category,
    wherein generating the second score for the second merchant is further based on the third tip amount and a weight assigned to the second higher weighted category.

4. The method of claim 3, further comprising:
    categorizing the second customer as a variable tipper,
    wherein categorizing the third tip amount into the second higher weighted category is in response to categorizing the second customer as a variable tipper.

5. The method of claim 4, wherein generating the second score comprises:
    generating a first average of a first set of tip amounts categorized into the second higher weighted category, wherein the first set of tip amounts comprises the third tip amount;
    generating a second average of a second set of tip amounts categorized into the second lower weighted category, wherein the second set of tip amounts comprises the second tip amount; and
    generating a weighted average of the first average and the second average using the weight assigned to the second higher weighted category and the weight assigned to the second lower weighted category.

6. The method of claim 3, wherein generating the second score comprises:
    generating a first ratio based on the second tip amount and the tip range for the first customer;
    generating a second ratio based on the third tip amount and a tip range for the second customer;
    generating a weighted average of at least:
        the first ratio weighted by the weight assigned to the second lower weighted category; and
        the second ratio weighted by the weight assigned to the second higher weighted category.

7. The method of claim 1, further comprising:
    determining a third tip amount given by a second customer to the second merchant is a custom tip amount entered into a user interface of a payment terminal of the second merchant by the second customer;
    in response to determining the third tip amount is a custom tip amount, categorizing the third tip amount into the second higher weighted category;
    determining a fourth tip amount given by a third customer to the second merchant is a standard tip amount selected from the user interface of the payment terminal by the third customer;
    in response to determining the fourth tip amount is a standard tip amount, categorizing the fourth tip amount into the second lower weighted category,
    wherein the user interface of the payment terminal displays an option for selecting the standard tip amount and an option for entering the custom amount,
    wherein generating the second score is further based on the third tip amount, a weight assigned to the second higher weighted category, and the fourth tip amount.

8. A system comprising a memory, a microprocessor coupled to the memory, and a data repository within said memory, the microprocessor configured to perform operations comprising:
    storing, within the data repository, a plurality of transactions comprising:
        a first transaction from a point of sale or customer credit card information that includes a first tip amount given by a first customer to a first merchant, and a second transaction that includes a second tip amount given by the first customer to a second merchant;
categorizing, by a machine learning algorithm configured to cluster, the first customer as a consistent tipper based on the plurality of transactions;
determining a tip range for the first customer;
in response to categorizing the first customer as a consistent tipper and the first tip amount falling outside the tip range for the first customer, categorizing the first tip amount into a first higher weighted category associated with the first merchant, wherein the first merchant is further associated with a first lower weighted category;
in response to categorizing the first customer as a consistent tipper and the second tip amount falling within the tip range for the first customer, categorizing the second tip amount into a second lower weighted category associated with the second merchant, wherein the second merchant is further associated with a second higher weighted category;
generating:
a first score for the first merchant based on the first tip amount and a weight assigned to the first higher weighted category associated with the first merchant comprising the first tip amount; and
a second score for the second merchant based on the second tip amount and a weight assigned to the second lower weighted category associated with the second merchant comprising the second tip amount; and
causing a graphical user interface (GUI) to be displayed on a computing device of a user, the GUI comprising:
a recommendation of either the first merchant or the second merchant for the user based on the first score and the second score; and
one or more GUI widgets for adjusting the weight assigned to the first higher weighted category and the weight assigned to the second lower weighted category.

9. The system of claim 8, wherein the first tip amount is a zero amount tip.

10. The system of claim 8, the operations further comprising:
categorizing a third tip amount given by a second customer to the second merchant into the second higher weighted category,
wherein generating the second score for the second merchant is further based on the third tip amount and a weight assigned to the second higher weighted category.

11. The system of claim 10, the operations further comprising:
categorizing the second customer as a variable tipper,
wherein categorizing the third tip amount into the second higher weighted category is in response to categorizing the second customer as a variable tipper.

12. The system of claim 11, wherein generating the second score comprises:
generating a first average of a first set of tip amounts categorized into the second higher weighted category, wherein the first set of tip amounts comprises the third tip amount;
generating a second average of a second set of tip amounts categorized into the second lower weighted category, wherein the second set of tip amounts comprises the second tip amount; and
generating a weighted average of the first average and the second average using the weight assigned to the second higher weighted category and the weight assigned to the second lower weighted category.

13. The system of claim 10, wherein generating the second score comprises:
generating a first ratio based on the second tip amount and the tip range for the first customer;
generating a second ratio based on the third tip amount and a tip range for the second customer;
generating a weighted average of at least:
the first ratio weighted by the weight assigned to the second lower weighted category; and
the second ratio weighted by the weight assigned to the second higher weighted category.

14. The system of claim 8, the operations further comprising:
determining a third tip amount given by a second customer to the second merchant is a custom tip amount entered into a user interface of a payment terminal of the second merchant by the second customer;
in response to determining the third tip amount is a custom tip amount, categorizing the third tip amount into the second higher weighted category;
determining a fourth tip amount given by a third customer to the second merchant is a standard tip amount selected from the user interface of the payment terminal by the third customer;
in response to determining the fourth tip amount is a standard tip amount, categorizing the fourth tip amount into the second lower weighted category,
wherein the user interface of the payment terminal displays an option for selecting the standard tip amount and an option for entering the custom amount,
wherein generating the second score is further based on the third tip amount, a weight assigned to the second higher weighted category, and the fourth tip amount.

15. A non-transitory computer-readable storage medium (CRSM) having instructions stored thereon that, when executed by at least one computing device, causes the at least one computing device to perform operations comprising:
storing, in a data repository, a plurality of transactions comprising:
a first transaction from a point of sale or customer credit card information that includes a first tip amount given by a first customer to a first merchant, and
a second transaction that includes a second tip amount given by the first customer to a second merchant;
categorizing, by a machine learning algorithm configured to cluster, the first customer as a consistent tipper based on the plurality of transactions;
determining a tip range for the first customer;
in response to categorizing the first customer as a consistent tipper and the first tip amount falling outside the tip range for the first customer, categorizing, the first tip amount into a first higher weighted category associated with the first merchant, wherein the first merchant is further associated with a first lower weighted category;
in response to categorizing the first customer as a consistent tipper and the second tip amount falling within the tip range for the first customer, categorizing the second tip amount into a second lower weighted category associated with the second merchant, wherein the second merchant is further associated with a second higher weighted category;
generating:
a first score for the first merchant based on the first tip amount and a weight assigned to the first higher weighed category associated with the first merchant comprising the first tip amount; and a second score for the second merchant based on the second tip amount and a weight assigned to the second lower weighted category associated with the second merchant comprising the second tip amount; and causing a graphical user interface (GUI) to be displayed on a computing device of a user, the GUI comprising:
  a recommendation of either the first merchant or the second merchant for the user based on the first score and the second score; and
  one or more GUI widgets for adjusting the weight assigned to the first higher weighted category and the weight assigned to the second lower weighted category.

16. The non-transitory CRSM of claim 15, the operations further comprising:
  categorizing a third tip amount given by a second customer to the second merchant into the second higher weighted category,
  wherein generating the second score for the second merchant is further based on the third tip amount and a weight assigned to the second higher weighted category.

17. The non-transitory CRSM of claim 16, the operations further comprising:
  categorizing the second customer as a variable tipper,
  wherein categorizing the third tip amount into the second higher weighted category is in response to categorizing the second customer as a variable tipper.

18. The non-transitory CRSM 17, wherein generating the second score comprises:
  generating a first average of a first set of tip amounts categorized into the second higher weighted category, wherein the first set of tip amounts comprises the third tip amount;
  generating a second average of a second set of tip amounts categorized into the second lower weighted category, wherein the second set of tip amounts comprises the second tip amount; and
  generating a weighted average of the first average and the second average using the weight assigned to the second higher weighted category and the weight assigned to the second lower weighted category.

19. The non-transitory CRSM of claim 16, wherein generating the second score comprises:
  generating a first ratio based on the second tip amount and the tip range for the first customer;
  generating a second ratio based on the third tip amount and a tip range for the second customer;
  generating a weighted average of at least:
    the first ratio weighted by the weight assigned to the second lower weighted category; and
    the second ratio weighted by the weight assigned to the second higher weighted category.

20. The non-transitory CRSM of claim 15, the operations further comprising:
  determining a third tip amount given by a second customer to the second merchant is a custom tip amount entered into a user interface of a payment terminal of the second merchant by the second customer;
  in response to determining the third tip amount is a custom tip amount, categorizing the third tip amount into the second higher weighted category;
  determining a fourth tip amount given by a third customer to the second merchant is a standard tip amount selected from the user interface of the payment terminal by the third customer;
  in response to determining the fourth tip amount is a standard tip amount, categorizing the fourth tip amount into the second lower weighted category,
  wherein the user interface of the payment terminal displays an option for selecting the standard tip amount and an option for entering the custom amount,
  wherein generating the second score is further based on the third tip amount, a weight assigned to the second higher weighted category, and the fourth tip amount.

* * * * *